Patented May 12, 1942

2,282,479

UNITED STATES PATENT OFFICE 2,282,479

ROOFING GRANULE AND THE LIKE

Robert T. Johnston, deceased, late of Plainfield, N. J., by Clara E. Johnston, administratrix, Newark, N. J., assignor, by mesne assignments, to Bakelite Corporation, a corporation of New Jersey No Drawing. Application September 25, 1936, Serial No. 102,542

2 Claims. (Cl. 91—70)

This invention relates to coated granules and is a continuation in part of co-pending applications Serial Nos. 558,247 and 596,715, now Patents Nos. 2,060,083 and 2,060,084, respectively. More particularly the invention comprises individual granules provided with durable protective coatings, particularly colored coatings, characterized by substantial infusibility, substantial insolubility, excellent adhesion, and great resistance to color changes, abrasion, corrosion, and deterioration due to exposure and heat and cold in weather exposure. Coated granules of this type are useful for building ornamentation, and especially as a protective surfacing for prepared roofing and siding material, which generally comprises a fibrous foundation sheet saturated or impregnated with a low melting point bitumen, and provided with a high melting point bituminous layer in which the coated granules of the invention may be secured. The coated granules are also useful, for instance, as a surfacing for wood shingles and siding and as a studding for cement coatings or casts, all of these being included in the term "roofing" as stated in Patent No. 2,060,083.

In accordance with the present invention, coatings as hereindescribed which are homogeneous, and upon application to a rough or porous surface, if the granule base be of such character, no separation into components is found to occur, but instead, adherent films of uniform continuity remain to give coatings resistant to penetration by moisture and other agents. Moreover, these compositions may be transparent or translucent or may be extended by fillers, for example, pigments or other coloring matter. Furthermore, the compositions contemplated by this invention provide improved adhesion to the base granule, substantially permanent gloss, compatibility for and better anchoring of pigments in the coating film and better anchorage of the coated granules to such adhesives as asphalt and the like. Also these compositions provide coating granules more resistant to abrasion in handling and transportation. These and other objects of the invention will be apparent from the description and details which follow.

Coating or protective compositions for the purpose of this invention comprise oil compositions which yield a film that is hardenable by polymerization, accompanied to a more or less limited extent by oxidation, to a non-softening condition, and in general are oil compositions modified by the inclusion of synthetic resins, and, more particularly and preferably, those of the phenolic type which in themselves possess the property of solubility or miscibility with oils without necessitating the addition of any solubilizing agent, such as rosin, ester gum or other natural resins; resin-oil compositions of this character show a remarkable resistance to weather changes and freedom from destructive oxidation and therefore make desirable coatings for granules and show marked improvements over coating compositions heretofore used for that purpose. The coating is non-softening under the heat of the sun and forms a flexible, tough film that is continuous and non-penetrative by moisture. In addition such coatings are resistant to abrasion and combustion. It is found that but small amounts of such oil soluble resin profoundly modify the oil characteristics with respect to resistance to progressive oxidation and to acids and alkalies out of all proportion to the resin content. However it is preferred that compositions containing 1 to 4 parts by weight of oil and 1 part of resin, depending whether the resin is of the heat reactive type or of the heat non-reactive type, be used. If of the first type, then the preferred ratio is 1 part of resin to 1 to 1.5 parts of oil; while if the second type is used, then the preferred ratio is 1 part of resin to 2 to 4 parts of oil. Such compositions yield coatings which are preferred for their non-brittle and excellent adhesive qualities.

Phenolic resins of the preferred oil soluble type herein referred to, are in general obtained by reacting a phenolic body, which may be phenol, cresol or higher substituted phenol or derivative, with a methylene-containing agent, such as formaldehyde or its polymers or compounds, furfural, benzaldehyde, etc., and a suitable catalyst. Lower phenolic and similar resins which in themselves are not miscible with oils can be made so by blending them with sufficient proportions of rosin, ester gum or other natural resins; such additions, however, affect injuriously the desirable properties of the phenolic resin in proportion to the amount included. The desirability is not, however, affected as greatly when a limited proportion of rosin is reacted together with the phenolic body, the aldehyde and drying oil in approximately equal proportions of resinous body and drying oil and sufficient aldehyde to obtain a heat polymerizable resin; in such compositions the rosin or equivalent modifying agent is limited in amount to no greater than 30 to 40 parts by weight of rosin to 100 parts by weight of phenolic body. Oil soluble or suspensible resins may however be obtained from lower phenols without the necessity of including rosin or the like, by incorporating an oil such as tung oil, as a reactive ingredient of the resin, and preferably by reacting the oil first with the phenol and then with a methylene-containing agent. The higher phenols such as alkyl or aryl, for instance phenyl substituted phenols form resins which in themselves are miscible or suspensible with drying oils and which therefore exhibit in a striking manner the properties hereinbefore mentioned. Accordingly the last type mentioned constitutes the preferred form of phenolic resins, particularly when associated with oils.

In place of the oil-resin compositions described there can be used the alkyd or the polyhydric alcohol types of compositions for granule coatings, which are generally prepared by reacting together at elevated temperatures, 180–230° C., a polybasic acid or acid anhydride, such as maleic acid or phthalic anhydride, a drying oil fatty acid, such as linseed oil, or soya bean oil fatty acid, and a polyhydric alcohol, such as glycerol, sorbitol, pentaerythritol, until a resinous ester is formed having an acid number of approximately 15–35 and which may be either a soft, viscous resin or relatively hard resin, depending whether a greater or lesser amount of drying oil fatty acid is used in proportion to the amount of polybasic acid. In this type the oil equivalent is a reactive ingredient in the formation of the ester, but the term "oil-resin composition" as used herein is intended to be inclusive of it. In general, the resin will be softer and more fluid in character, the greater the amount of drying oil fatty acid used. The polyhydric alcohol usually should be used in an amount which would theoretically effect complete esterification of both drying oil fatty acids and polybasic acids. The drying oil fatty acids may be replaced in part by semi-drying or non-drying oil fatty acids, and the polyhydric alcohol may be in part ethylene glycol. Softer and slower hardening resins will usually result by the use of these ingredients. Either soft or hard resins are dispersible in the usual coating composition thinners, such as toluol, turpentine, naphtha, etc., the soft resins ordinarily being the more readily soluble, and the compositions are usually employed in solutions of from 50–60% solids content. In general, those polyhydric alcohol resinous compositions are preferred wherein a mole of drying oil fatty acid is employed for each mole of polybasic acid along with sufficient polyhydric alcohol to effect theoretical esterification of the acids.

The oils found most suitable for the purpose of this invention are the drying oils, particularly tung, linseed, rapeseed, etc. These oils when mixed with resins as described, form mixtures which, depending upon the extent of drying oil present, are compatible with volatile solvents such as alcohol, mineral spirits, xylol, turpentine, etc. Alcohol is inferior, however, for the preferred coating compositions, i. e. oil compositions, of the invention as it is not a solvent for the drying oils and the amount of oil contemplated in such composition is too great to form a satisfactory composition with this solvent. Coal tar thinners are preferred as diluents for the purposes of this invention. If desired, the resins may be modified by the addition of high boiling solvents such as dibutyl phthalate, tricresyl phosphate, aniline, etc.

While the compositions referred to may be employed in colorless conditions, that is, they may be transparent or translucent and be free of added coloring pigments, it is preferred that pigments and/or other fillers be added for the reason that such materials greatly improve the anchoring ability of the coated granules to adhesives as asphalt and the like. Moreover, the oil compositions referred to are particularly compatible with coloring pigments and permanently protect these materials so that their original color quality and the gloss and brilliancy of the finished coating is maintained. Thus such combinations make available for use, colored granules not heretofore obtainable and granules with substantially permanent weathering characteristics.

The oil compositions may contain resins of either a heat reactive type or a heat non-reactive type, and may be air dried at temperatures above room temperature; or it may be desirable to bake them at elevated temperatures (250–300° F.) to convert them to the most resistant state. Oil compositions containing resins of the heat reactive type generally produce the more durable coatings and are therefore preferred. Thus, oil compositions containing the heat reactive type of polyhydric alcohol resins produce coatings of good weather resistant properties and great gloss and luster retainment on exposure, although to obtain the most resistant type of coating when using these polyhydric alcohol resins the oil compositions containing them are preferably baked at the elevated temperatures above indicated. Oil compositions containing the heat reactive type of phenolic resins, which are the preferred coating compositions of the invention, may also be baked and the resin polymerized to a most resistant and infusible state. However, a further feature of the invention resides in advancing polymerization of the heat reactive type of phenolic resins, merely by exposure to the sun's heat which will usually be sufficient to convert these heat reactive phenolic resins to the infusible state and yield coatings which are exceedingly resistant to abrasion, weathering and corrosion and have excellent adhesive properties. According to this procedure, the baking process may be omitted in fabrication, and the coated granules with merely a dried or partially polymerized casing may be applied to a base, for instance to a well known bitumen coated roofing sheet, as a surfacing and partially embedded therein. The softer casing on the embedded portion of the granule will have especially good adhesive properties relative to the bituminous coating and the exposed portions of the granule casings will be improved by continued polymerization on exposure to the sun's heat. In effect a coated granule is thus obtained having portions of its casing in a different state of polymerization and each portion yielding the most desirable properties for its particular part in the structure of which the coated granule forms a part.

It is also contemplated to improve the properties of coating compositions of the polyhydric alcohol type of resin-oil composition by blending said composition with an oil composition of the phenolic type and employing the blend as the coating composition. The resultant composition will obtain improved weathering and adhesive properties over an oil composition of the polyhydric alcohol type of resin and without substantial sacrifice of the great gloss and luster retainment characteristics of such a composition. Where the blend contains an oil composition containing a heat reactive type of phenolic resin, the resultant casing as in the case of a heat reactive type of phenolic resin oil composition above, may be improved without baking by merely exposing the casing to the effect of the sun's heat and causing advanced polymerization of the heat reactive phenolic portion.

The base granules for the purposes of this invention may be any of those commonly employed for roofing purposes or those having sufficient physical strength by themselves to normally withstand exposure to the weather. In fact base granules, for instance porous granules, which deteriorate rather quickly on exposure to the weather, may now be used, as the resins herein described thoroughly protect the granule and prevent it from deteriorating, as they envelop the granule and hold it together and do not crack or let such elements as water, oxygen, gas, acids, etc. into the granule. In certain instances, where heat treatments are to be effected, it is preferred that the granules be of a character that will withstand temperatures between 150–300° F. without injury thereto. The granules may be, for instance, sand particles, crushed quartz, crushed silica, crushed glass, crushed slag, crushed brick, crushed slate, crushed tile, particles of cement, crushed shale or gravel. Granules such as these for roofing purposes are generally between 8 and 30 mesh. However, the invention is not limited to this particular range of sizes and more than one size of granule may be treated at a single time.

The granules may be coated with the oil compositions aforesaid by spraying or by placing the composition and granules in suitable mixing equipment well known to the industry. For example, the composition and granules may be placed in a tumbling barrel and tumbled until the granules are fully coated, subsequently the solvent is evaporated either by spreading the granules on suitable trays and exposing them at room temperature in a current of air, or by force drying them at temperatures slightly above room temperature—say 100–150° F. After the solvent is evaporated, the film deposited on the granules is further advanced by continued air drying at room temperature, or it may be force dried—say at 100–150° F., or baked at elevated temperatures of 250–300° F. Usually air drying requires from 4 to 12 hours, while force drying will require from 1 to 4 hours, whereas baking requires, say from 10–20 minutes up to 1 hour. Or these methods may be combined: i. e., the films may be partially hardened by air or force drying and then baked to complete the hardening; or they may be baked only sufficiently to set the film, and the hardening or advancement of the film completed after the coating is applied to the shingle and the shingle exposed to the weather. It is also contemplated to mix the granules and coating composition, using sufficient granules to form a plastic mass and then to roll the mixture into a relatively thin layer and permit it to harden. Where the tumbling process is employed the coating composition is preferably added in portions of such magnitude that the mixture does not boil up or become sticky but is free flowing and granular. These additions may be continued until a casing of desired thickness is found, the solvent being evaporated and/or the films dried after each addition. According to this process it is possible to employ batches of different oil compositions, for instance the base granules may be first given a casing of an oil composition containing a heat reactive type of phenolic resin and then a casing of an oil composition containing a heat reactive type of polyhydric alcohol resin and so on, and the resultant granule layer baked. Subsequently the layer is crushed and screened to obtain the colored granules of the desired size. Also pigments or fillers may be added to the coating composition, as by grinding before or after addition of the granules.

The coated granules following or at any stage of the aforesaid treatment may be embedded or otherwise secured as a surfacing in sheet roofing material, for example a fibrous asphalt coated sheet, or may be used as a surfacing for cementitious products, or wood products to be exposed to the weather.

The following are examples which are illustrative of this invention:

Example 1

A coating composition is prepared by processing 150 parts by weight of a drying oil, such as a blend of equal parts of linseed oil and China-wood oil, with 100 parts of a phenolic resin, oil-soluble without requiring modification with rosin, ester gum or natural resins, such as can be prepared from an alkyl or aryl substituted phenol or high boiling tar acids, when reacted under alkaline conditions with substantially equimolecular or larger amounts of an aldehyde, such as formaldehyde or its polymers, such that a resin is obtained which can be converted to the infusible, insoluble state when heated alone or in admixture with drying oils. The oil-soluble, heat-reactive phenolic resin is blended with the drying oils and processed by heating the mixture together at 350 to 450° F. for a period sufficient to obtain partial polymerization. It is then reduced with a volatile thinner to about 60% solid content to facilitate application as a coating composition for granules. Pigments or fillers to the extent of about 10–50% are incorporated with the vehicle by grinding. The pigmented vehicle is then applied, for example, by tumbling the granules such as crushed silica in a tumbling barrel heated to 125–200° F. and adding the vehicle in portions of such magnitude that the mixture does not ball up or become sticky, but is free flowing and granular. A total amount of vehicle is added until a continuous encasing coating of about .001 in. thickness is built up around the granules. After the final portion of vehicle is added, the tumbling may be continued and the coating further advanced at 125–200° F., or the granules may be discharged into suitable trays and baked at more elevated temperatures, 250–300° F., or the tumbling barrel may be heated at the lower temperatures and the granules given only a superficial hardening sufficient to prevent them from adhering together. Further advancement of the coating on the granules can then be effected by exposure to the sun's heat after the granules have been embedded in for instance the asphalt adhesive coating of a roofing base. The coated granules, when the coating has been advanced to the infusible, insoluble state are resistant to boiling water, unaffected by 5% alkali over a period of 24 hours, and resist such solvents as alcohol and gasoline and bitumen oils. They are resistant to abrasion, weathering, and the encasing coating adheres tenaciously to the base granule.

Example 2

A coating composition is prepared according to Example 1 with the following modifications: The phenolic constituent, such as an alkyl or aryl substituted phenol or high boiling tar acids, is reacted under acid conditions together with substantially equimolecular or lesser amounts of an aldehyde, such as formaldehyde or its polymers, such that a resin is obtained which is hard and permanently fusible and miscible with drying oils. The oil-soluble phenolic resin is blended with drying oils and processed by heating the mixture together at 400 to 560° F. for a period to obtain partial oxidation and polymerization of the drying oils. It is then reduced with a volatile thinner to about 60% solids content and used according to Example 1. Driers may be added to facilitate the hardening of the film and the coating may be air dried at normal temperature (70° F.).

Example 3

A coating composition is prepared by reacting together a polybasic acid or acid anhydride, such as phthalic anhydride or maleic anhydride, a drying oil fatty acid, such as linseed oil fatty acids or China-wood oil fatty acids, with a polyhydric alcohol, such as glycerine, in substantially the ratio in parts by weight of 1.5-2 polybasic acid, 1.5-1.0 drying oil fatty acid to 1.0 polyhydric alcohol, to a temperature of 180 to 230° C. When the reaction has progressed such that the acid number of the reaction mass has decreased to about 35, a thinner is added to facilitate application as a coating for granules. The solution may be pigmented or extended and the granules coated and treated according to Example 1.

Example 4

A pigmented liquid coating composition made according to Examples 1 and 3 is blended together in the proportion of equal weights and the granules are coated according to Example 1.

Example 5

A coating composition is prepared by reacting together 1 part by weight of a phenol, such as cresol, with a substantially equimolecular or greater proportion of an aldehyde, such as formaldehyde, or its polymers, and 0.5-1.0 part rosin and 1-1.5 parts of a drying oil, such as China-wood oil, in the presence of an alkaline catalyst for a period of time to obtain complete separation of resin from the aqueous layer. The volatile constituents are removed usually by heating to 125° C. either at ordinary or diminished pressure. The resinous material is then partially polymerized at 150° C. and reduced to about 50% solids with a volatile thinner and granules are coated according to Example 1.

From the foregoing it will be evident that there has been produced an improved coated granule that will add character and beauty to the roofing and siding materials now in use, that will provide an improved granule casing and where colored, permanent and brilliant colors heretofore unavailable in such material, particularly, colors highly desirable for distinctive structures where only heavy tiles have been used. Moreover, the invention provides coated granules that have excellent adhesion to and improve the entire base structure of composition roofing and will extend considerably the life of such products. It will be understood that certain modifications in the coated granules, in the coating compositions, and in the methods of producing the compositions and methods of coating the granules may be made without departing from the spirit of this invention, and it is therefore to be understood that the invention is to be construed as including all equivalents and as broadly as the claims, taken in conjunction with the prior art, may allow.

What is claimed is:

1. Process of preparing roofing having a surfacing layer of granules which comprises providing a base with a bitumen coating, applying to granules an oil-resin composition hardenable to a non-softening condition and selected from the group consisting of drying oil-phenolic resin compositions, fatty acid modified alkyd esters and their mixtures, partially hardening the applied composition on the granules to a condition characterized by adhesiveness to bitumen coatings, fixing the so-treated granules as a surfacing layer on the bitumen coating of the base with exposed portions out of contact with the coating, and subsequently further hardening the exposed non-contacting portions of the composition on the granules to a non-softening condition.

2. Roofing granule suitable for a surfacing layer on bases with bitumen coatings which comprises a granule and a protective coating on the granule of an oil-resin composition of a type hardening to a non-softening condition and selected from the group consisting of drying oil-phenolic resin compositions, fatty acid modified alkyd esters and their mixtures, said protective coating being in a condition of hardness characterized by adhesiveness to bitumen coatings and non-softening on exposure to weathering.

CLARA E. JOHNSTON,
*Administratrix of the Estate of Robert T. Johnston, Deceased.*

CERTIFICATE OF CORRECTION.

Patent No. 2,282,479. May 12, 1942.

ROBERT T. JOHNSTON, DECEASED,
BY CLARA E. JOHNSTON, ADMINISTRATRIX.

It is hereby certified that error appears in the printed specification of the above numbered patent requiring correction as follows: Page 1, first column, line 26, before the syllable "coat-" insert --granules are provided with--; and that the said Letters Patent should be read with this correction therein that the same may conform to the record of the case in the Patent Office.

Signed and sealed this 7th day of July, A. D. 1942.

(Seal)

Henry Van Arsdale,
Acting Commissioner of Patents.